Figure 3:
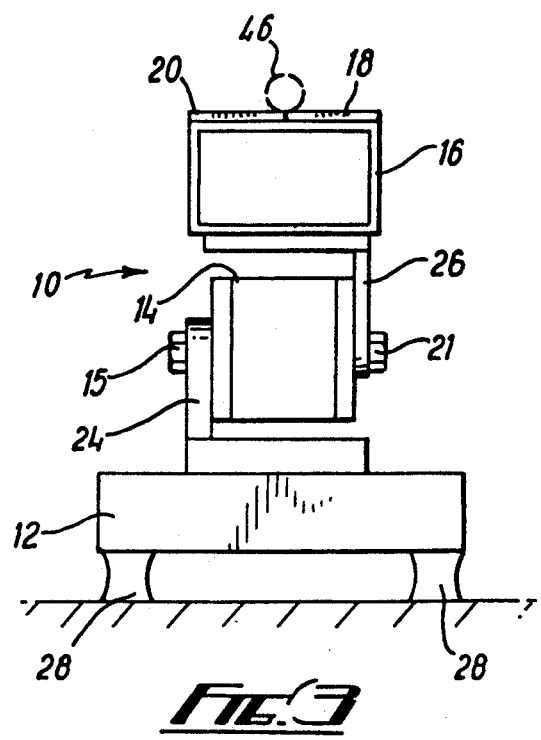

United States Patent [19]

Higson

[11] Patent Number: 5,085,314
[45] Date of Patent: Feb. 4, 1992

[54] TRANSFER APPARATUS

[75] Inventor: Alan Higson, Lytham St Annes, United Kingdom

[73] Assignee: British Nuclear Fuels plc, Warrington, Great Britain

[21] Appl. No.: 660,047

[22] Filed: Feb. 25, 1991

[30] Foreign Application Priority Data

Mar. 7, 1990 [GB] United Kingdom ............... 9005082.4

[51] Int. Cl.$^5$ ............................................ B65G 27/00
[52] U.S. Cl. ...................................... 198/755; 198/771
[58] Field of Search ............... 198/389, 750, 752, 755, 198/758, 771, 772

[56] References Cited

U.S. PATENT DOCUMENTS 4,174,028 11/1979 Barnes ................................. 198/389
4,778,043 10/1988 Sticht ................................... 198/389
4,844,236 7/1989 Kraus ............................. 198/771 X

FOREIGN PATENT DOCUMENTS 2223998 4/1990 United Kingdom ................ 198/755

Primary Examiner—Joseph E. Valenza
Assistant Examiner—Tuan N. Nguyen
Attorney, Agent, or Firm—William R. Hinds

[57] ABSTRACT

A transfer apparatus having a platform in the form of two members extending in adjacent parallel relationship in a substantially linear direction. Vibrators are arranged to oscillate the members independently of each other in out-of-phase relationship in the linear direction. The members may have their faces in angular facing relationship. The faces of the members have thereon cushion elements which comprise a multiplicity of extremely fine, flexible synthetic polymer fibers having a length no greater than about 2.5mm, and an inclined orientation of at least 70° from a backing.

9 Claims, 3 Drawing Sheets

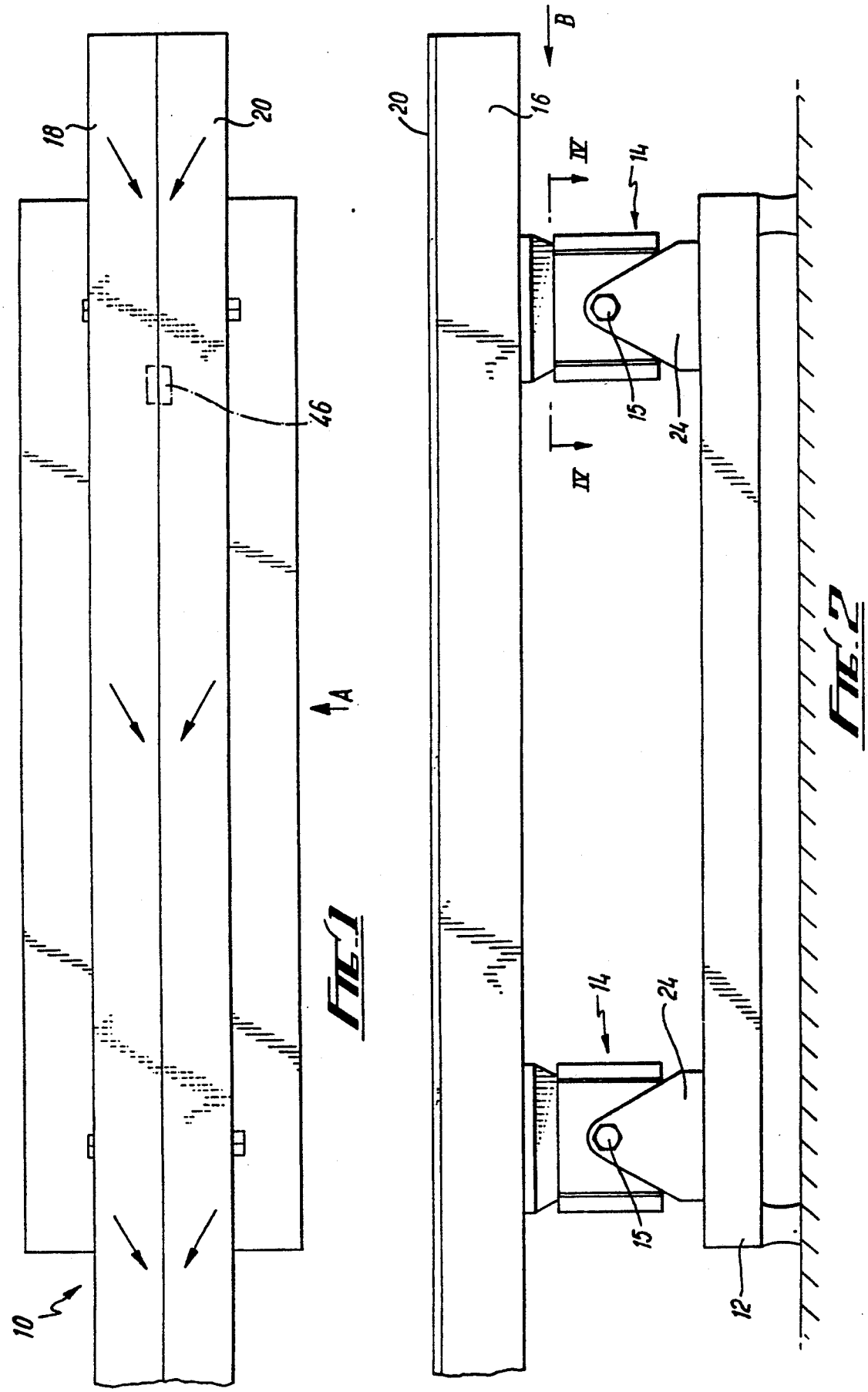

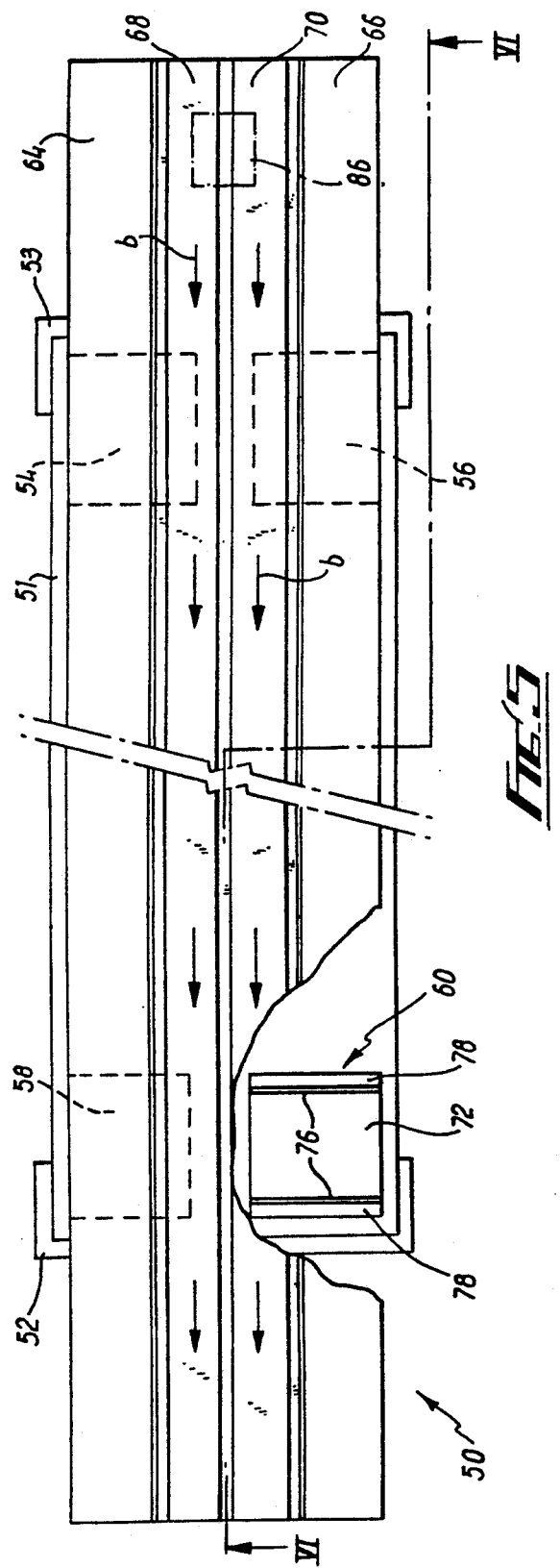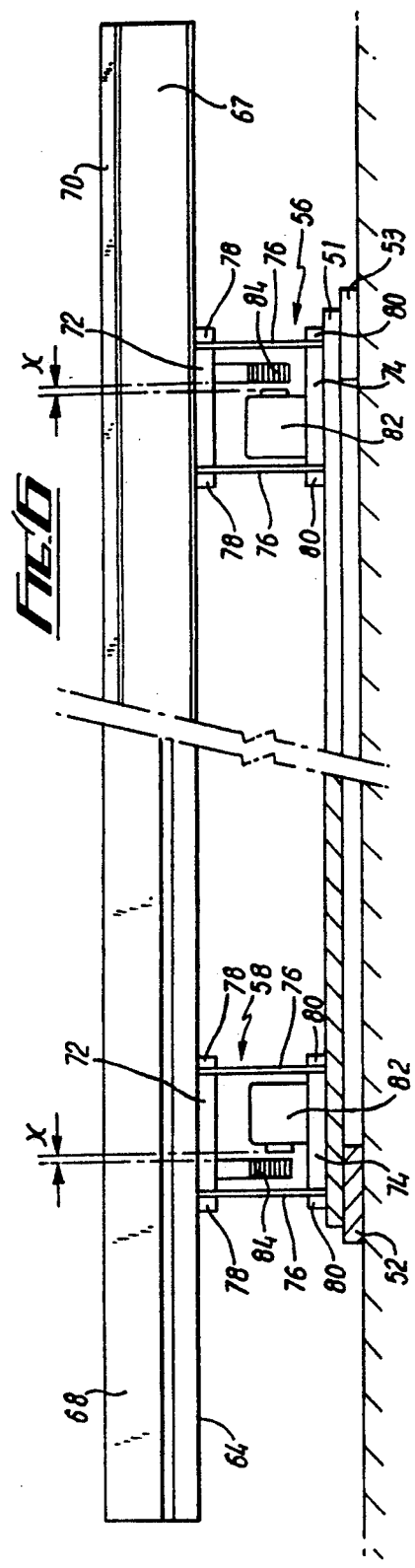

TRANSFER APPARATUS

This invention relates to an apparatus for transferring an object, and more particularly but not exclusively, for transferring a relatively light object such as a relatively small fragile object.

Examples of such an apparatus are described in our co-pending British patent application Ser. No. 2223998A (U.S. Ser. No. 406102 filed 12 Sept. 1989) which is incorporated by reference herein.

According to the present invention, there is provided a transfer apparatus comprising a platform arranged to be vibrated so as to transfer objects thereon, wherein the improvement comprises, the platform comprises two members which extend in adjacent parallel relationship in a substantially linear direction, a plurality of vibrator means for oscillating the members independently of each other in out-of-phase relationship in said linear direction, a relatively heavy base provided for supporting the vibrator means, and cushion elements affixed onto the members for supporting the object, each which cushion element comprises a multiplicity of flexible synthetic polymer fibres having a thickness not greater than about 45 microns and packed in a backing, the fibres having a length not greater than about 2.5 mm above the backing and an inclined orientation of at least 70° from the backing in a direction selected to arrange a desired direction of transfer of the object when the members are oscillated by the vibrator means.

Also according to the invention, a transfer apparatus comprises two elongate members extending in adjacent relationship parallel to a substantially linear direction, vibrator means for oscillating the members independently of each other in out-of-phase relationship in said linear direction, and cushion elements affixed to the members for supporting an object to be transferred, each which cushion elements comprises a multiplicity of flexible synthetic polymer fibres having a thickness not greater than about 45 microns and packed in a backing, the fibres having a length not greater than about 2.5 mm above the backing and an inclined orientation of at least 70° from the backing in a direction selected to arrange a desired direction of transfer of the object when the members are oscillated by the vibrator means. The members may have faces in angular facing the cushion elements being affixed to the faces.

The fibres in the cushion elements may be inclined in the same direction, or may be inclined with respect to each other to produce a substantially linear motion of the object.

Preferably, the ultra high density pile is between 68 and $80 \times 10^6$ fibres per square meter, and may have a fibre length/thickness ratio of the order of 50:1. Advantageously the fibres have a thickness of between 43 to 45 microns. Desirably, the fibres comprise Nylon 66, and the backing comprises a glass fibre reinforced vinyl layer.

Preferably, the fibres are inclined in the backing at an orientation of about 80° from the backing.

Figure 4:
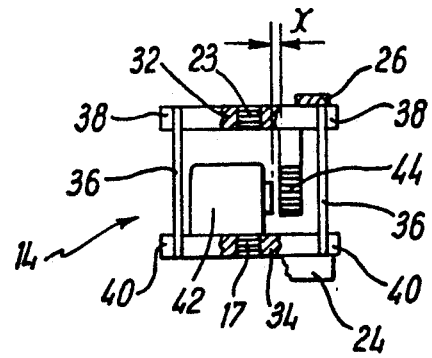
Figure 7:
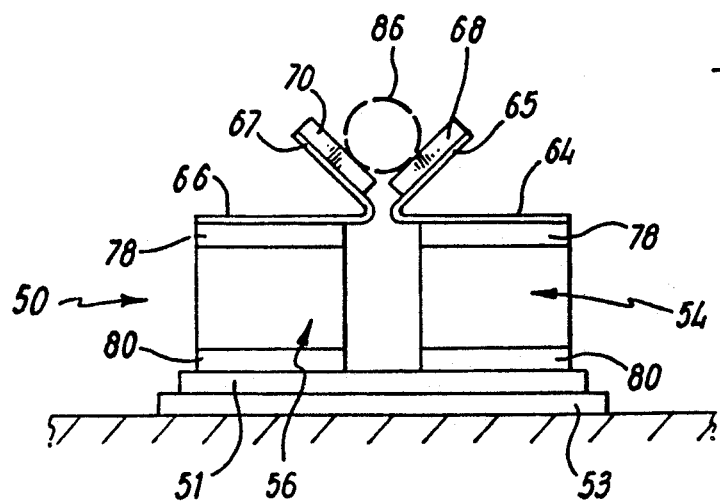

The invention will now be further described by way of example only with reference to the accompanying drawings, in which:

FIG. 1 shows a plan view of a transfer apparatus;
FIG. 2 shows a view in the direction of arrow A of FIG. 1;
FIG. 3 shows a view in the direction of arrow B of FIG. 2;
FIG. 4 shows a view on the line IV—IV of FIG. 2;
FIG. 5 shows an alternative transfer apparatus;
FIG. 6 shows a sectional view on the line VI—VI of FIG. 5, and
FIG. 7 shows a view in the direction of arrow A of FIG. 6.

Referring now to FIGS. 1 to 4, an apparatus 10 is shown and comprises a relatively heavy base 12 on which two vibrator units 14 are mounted and support a relatively lightweight, elongate support member 16. The upper surface of the support member 16 is covered with two parallel adjacent layers of cushion elements 18, 20 respectively having the fibres thereof inclined in a chevron pattern as shown by the arrows in FIG. 1. The vibrator units 14 are secured by a screw 15 locating in a threaded hole 17 to a substantial angled bracket 24 which is secured to the base 12, and are secured by a screw 21 locating in a threaded hole 23 to a lightweight angled bracket 26 which supports the support member 16. The apparatus 10 is supported on four resilient pads 28.

Each cushion element 18, 20 comprises a glass fibre reinforced vinyl base layer, and extermely fine synthetic polymer fibres (e.g. Nylon 66) integrated at one end in the base layer. The fibres are packed at an ultra high density pile in the base layer and at an angle of inclination with respect to the base layer of between 70° to 80°. The packing density of the fibres is of the order of $80 \times 10^6$ fibres per square meter, and each fibre is between 43 to 45 microns thick and projects up to 2.5 mm above the base layer. Each cushion element 18, 20 is secured to the support member 16 by a suitable attachment, for example an adhesive, or by the use of magnetic strip (not shown) attached to the support member 16 and having an adhesive backing for affixing the cushion elements 18, 20 thereto. The direction of inclination of the fibres in the cushion elements 18, 20 is in the direction shown by the arrows in FIG. 1.

As shown in FIG. 4, each vibrator unit 14 comprises a support plate 32 secured to the lightweight bracket 26 and a mounting plate 34 secured to the bracket 24. Two resilient cantilever leaf springs 36 extend between each support plate 32 and mounting plate 34 and are attached thereto by respective clamping bars 38, 40 secured by screws (not shown). An electromagnetic induction coil 42 is mounted on the mounting plate 34, and a laminated armature 44 extends from the support plate 32 in a position such as to define a required air gap x between the coil 42 in the de-energised state of the coil 42 and in the stationary position of the support member 16.

In operation, with pellets 46 (only one is shown in broken line) supported by the cushion elements 18, 20, the vibrator units 14 are operated by a half-wave alternating electric current (e.g. 100 Hz). This current causes the armatures 44 to be attracted to the coils 42 against the leaf spring 36 tension during the positive half cycle of the electric current with a consequent reduction in the air gaps x. During the negative half cycle of the current when no electric current exists, since it has been half-wave rectified, the armatures 44 return under the tension in the leaf springs 36 to a point where the air gaps x have increased from that at the aforesaid stationary position. The movement of the armatures 44 is repeated during next half-cycles of the electric current and causes oscillation of the support member 16. Because of the inclination of the fibres in the cushion elements 18, 20 the pellets are transferred along the cushion elements 18, 20 during the positive half-cycle of the electric current. During the return motion of the support member 16, the fibres of the respective cushion elements 18, 20 slide under the side of the pellet 46.

Synchronisation of the alternating current and the natural frequency of the support member 16 may be achieved by:

a. changing the frequency of the alternating current, or
b. changing the tension in the leaf springs 36, or
c. adding or subtracting weight from the oscillating mass of the apparatus.

Control of the amplitude of the oscillations of the support member 16 may be achieved by varying the power of the vibrator units 14. This can be conviently achieved by phase control of the alternating current waveform.

The action of the support plates 32 of the vibrator units 14 when oscillating causes an equal and opposite reaction on the mounting plates 34. The apparatus 10, therefore incorporates the relatively heavy base 12 to provide a large reaction mass, for example of the order of: 15x oscillating mass of the support member 16.

The vibrator units 14 may incorporate Vibroblock Vibrators such as type VB-12L, supplied by:

i. Arthur G Russel Co Inc
   139 Center Steret
   PO Box 237
   Bristol
   Connecticut 06010
   United States
ii. Arthur G Russel (UK) Limited
   Elliott Industrial Estate
   Arbroath DD11 2NJ
   Scotland
   United Kingdom For some applications alternative vibrator units, or an alternative number of vibrator units may be used. Other shapes of support member, and other electrical frequencies may also be used.

It will be appreciated that one of the advantages of the invention is that out-of-line (e.g. vertical) displacement of the support member 16 is minimised, its oscillatory movement being substantially linear (e.g. horizontal). Although the invention has been described in relation to horizontal oscillatory movement of the support member 16, if desired some other orientation of the support member 16 may be used. For some applications different cushion elements 18, 20 may be used to achieve a particular effect.

Suitable cushion elements may, for example, be supplied under the Trade Name "Flotex" by Bonar and Flotex Limited, Ripley, Derby, United Kingdom.

Further information on the cushion elements may be obtained from the afore-mentioned co-pending patent application.

Referring now to FIGS. 5 to 7, an apparatus 50 is shown. The apparatus 50 comprises a base 51 on which four vibrator units 54, 56, 58, 60 respectively are mounted in pairs 54, 56 and 58, 60 respectively, the vibrator units in each pair 54, 56, and 58, 60 being adjacent and disposed in 180° relationship to each other. Two elongate angle section support members 64, 66 are mounted in adjacent relationship on respective pairs of the vibrator units 54, 56, 58, 60. Each support member 64, 66 has a cushion element 68 or 70 on its angular face 65 or 67 such that the cushion elements 68, 70 are in angular facing relationship. Each cushion element 68, 70 is similar to the cushion elements 18, 20 of FIGS. 1 to 4 and comprises a glass fibre reinforced vinyl base layer, and extermely fine synthetic polymer fibres (e.g. Nylon 66) inte.g.rated at one end in the base layer, the fibres being packed at an ultra high density pile in the base layer and at an angle of inclination with respect to the base layer of between 70° to 80°. Each cushion element 68, 70 is secured to the respective support member 64, 66 by a suitable adhesive, the direction of inclination of the fibres therein being in the direction shown by the arrows 'b' in FIG. 5. The base 51 is supported by two resilient pads 52, 53 disposed at the ends of the base 51.

Each vibrator unit 54, 56, 58, 60 respectively comprises a top plate 72, and a bottom plate 74 which is secured to the base 51. Resilient struts 76 (e.g. leaf springs) extend between each top plate 72 and bottom plate 74 and are attached thereto by respective clamping bars 78, 80 secured by screws (not shown). An electromagnetic induction coil 82 is mounted on the bottom plate 74, and a laminated armature 84 depends from the top plate 72 in a position such as to define a required air gap x between the coil 82 in the de-energised state of the coil 82 and in the stationary position of the support members 64, 66.

In operation, with pellets 86 (only one is shown in broken line) supported by the cushion elements 68, 70, the vibrator units 54, 56, 58, 60 are operated by a half-wave alternating electric current (e.g. 100 Hz). This current causes the armatures 84 to be attracted to the coils 82 against the resilient strut 76 tension during the positive half cycle of the electric current with a consequent reduction in the air gaps x. During the ne.g.ative half cycle of the current when no electric current exists, since it has been half-wave rectified, the armatures 84 return under the tension in the resilient struts 76 to a point where the air gaps x have increased from that at the aforesaid stationary position. The movement of the armatures 84 is repeated during next half-cycles of the electric current and causes oscillation of the support members 64, 66. Because adjacent vibrator units 54, 56 and 58, 60 are in 180° relationship to each other, the support members 64, 66 oscillate in opposite directions, hence there is always some forward motion of the pellet 86 due to the inclination of the fibres in the cushion elements 68, 70 in the direction of the arrows. During the return motion of the support members 64, 66, the fibres of the respective cushion elements 68, 70 slide under the side of the pellet 86.

Synchronisation of the alternating current and the natural frequency of the support members 64, 66 may be achieved in a similar manner to that described in relation to the apparatus of FIGS. 1 to 4.

The action of the top plate 72 when oscillating causes an equal and opposite reaction on the bottom plate 74. Because the vibrator units 54, 56 and 58, 60 are mounted in pairs in alternate relationship on a common base 51, the opposite reactions should be substantially balanced. For some applications, however, the apparatus 50 may be mounted on a large reaction mass, for example of the order of: 15x oscillating mass of the apparatus 50.

The vibrator units 54, 56, 58, 60 may incorporate Vibroblock Vibrators, for example type VB-6L supplied by the aforementioned Arthur G Russel Co Inc, or Arthur G. Russel (UK) Limited.

Although angular shaped support members have been shown it will be understood that other shapes may be used. For some applications an alternative number of vibrator units may be used and this may depend to some extent on the length of the support members. Other electrical frequencies may also be used. It will be appreciated that the oscillatory movement of the support members is substantially linear, with very little out-of-line (e.g. vertical) displacement thereof.

Although the invention has been described in relation to the oscillatory movement of the support members 64, 66 being 180° out-of-phase, other out-of-phase relationships may be used. For some applications different cushion elements may be used to achieve a particular effect.

I claim:

1. A transfer apparatus comprising a platform arranged to be vibrated so as to transfer objects thereon, wherein the improvement comprises, the platform comprises two members which extend in adjacent parallel relationship in a substantially linear direction, a plurality of vibrator means for oscillating the members independently of each other in out-of-phase relationship in said linear direction, a relatively heavy base provided for supporting the vibrator means, and cushion elements affixed onto the members for supporting the object, each which cushion element comprises a multiplicity of flexible synthetic polymer fibres having a thickness not greater than about 45 microns and packed in a backing, the fibres having a length not greater than about 2.5 mm above the backing and an inclined orientation of at least 70° from the backing in a direction selected to arrange a desired direction of transfer of the object when the members are oscillated by the vibrator means.

2. An apparatus as claimed in claim 1, wherein the base is about fifteen times heavier than the members.

3. An apparatus as claimed in claim 1 wherein the vibrator means include resiliently flexible means for supporting the members.

4. An apparatus as claimed in claim 1, wherein the members have faces in angular facing relationship, and the cushion elements are affixed to the faces.

5. An apparatus as claimed in claim 1, wherein the vibrator means are arranged to oscillate the members in substantially 180° out-of-phase relationship.

6. A transfer apparatus comprising,
   a. an elongate base;
   b. an even number of vibrator units mounted in pairs along the base, the vibrator units in each pair being adjacent and disposed in substantially 180° relationship to each other, each vibrator unit comprising a top plate, a bottom plate, leaf springs in the form of resilient struts extending between the top plate and the bottom plate, and an electromagnetic vibrator means for oscillating the top plate;
   c. two elongate angle section support members mounted in opposing adjacent relationship on the top plates of respective pairs of the vibrator units such that the support members define a Vee-shaped space between the opposing faces thereof for supporting an object, the support members being about fifteen times lighter than the base and the vibrator units being oriented such that the leaf springs are arranged to flex in a direction substantially parallel with the direction of the support members;
   d. and a cushion element on each said opposing face, each cushion element comprising a multiplicity of flexible synthetic polymer fibres having a thickness no greater than about 45 microns and packed in a backing, the fibres having a length not greater than about 2.5 mm above the backing, and an inclined orientation of at least 70° from the backing in a direction selected to arrange a desired direction of transfer of the object on the cushion element, whereby the support members are oscillated by the vibrator units in a substantially linear direction parallel to the support members.

7. A transfer apparatus comprising two elongate members extending in adjacent relationship parallel to a substantially linear direction, vibrator means for oscillating the members independently of each other in out-of-phase relationship in said linear direction, and cushion elements affixed to the members for supporting an object to be transferred, each which cushion element comprises a multiplicity of flexible synthetic polymer fibres having a thickness not greater than about 45 microns and packed in a backing, the fibres having a length not greater than about 2.5 mm above the backing and an inclined orientation of at least 70° from the backing in a direction selected to arrange a desired direction of transfer of the object when the members are oscillated by the vibrator means.

8. Apparatus as claimed in claim 7 wherein the members have faces in angular facing relationship, and the cushion elements are affixed to the faces.

9. Apparatus as claimed in claim 7 wherein the vibrator means are arranged to oscillate the members in substantially 180° out-of-phase relationship.

* * * * *